July 17, 1962 R. C. KING 3,044,565
BATHROOM SCALE
Filed April 14, 1960
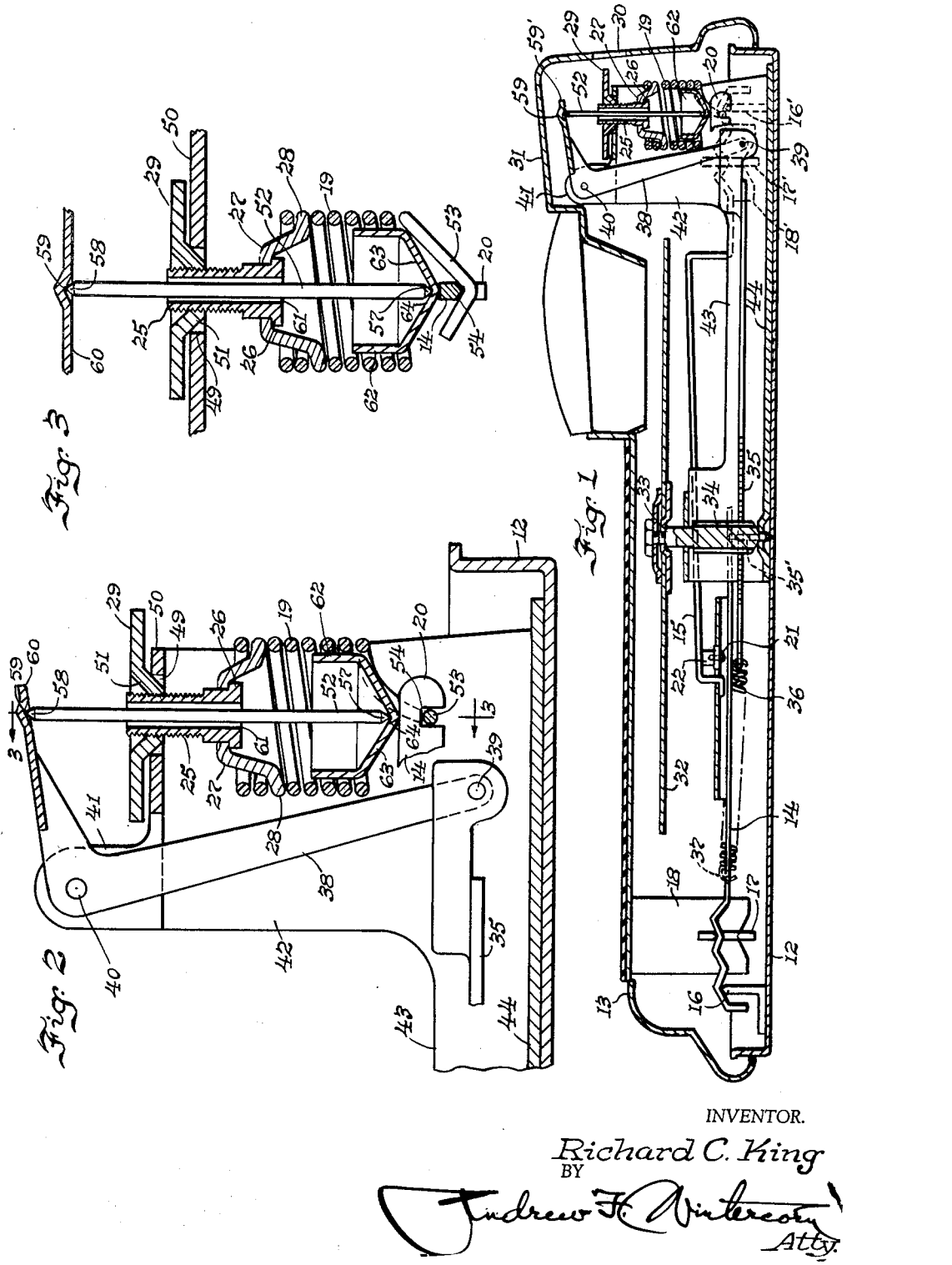
INVENTOR.
Richard C. King

3,044,565
BATHROOM SCALE
Richard C. King, Rockford, Ill., assignor to The Brearley Company, Rockford, Ill., a corporation of Illinois
Filed Apr. 14, 1960, Ser. No. 22,277
12 Claims. (Cl. 177—230)

This invention relates to a new and improved bathroom scale construction and is more particularly concerned with an improvement upon the construction disclosed in the copending application of Mike A. Provi, Serial Number 731,283, filed April 28, 1958.

The salient feature of the Provi construction is the provision of a follower pin, movable on the center line of the coiled tension spring on which the lever system of the scale is suspended, the pin serving accurately to register the exact amount of extension of the spring under all operating conditions and transmitting a corresponding amount of movement to the weight indicating means so as to give an accurate reading. With that construction, inasmuch as the arcuate movement of the outer end of the main lever is translated through the pin in the center of the spring into a corresponding arcuate movement of one arm of a bell-crank lever, the other arm of which in the arcuate movement of its free end translates the movement into linear movement of the rack that operates the pinion connected to the weight indicating dial, it follows that what are known as "arc losses" in the trade are substantially entirely eliminated, to the extent that error in weight indications is practically negligible, amounting to less than ⅛ of 1% by actual tests.

According to the present invention, a cup is provided having a conical shaped bottom resting at its center on the main lever and guided by its cylindrical body portion inside the lower portion of the spring, so that the conical lower end of the follower pin bearing at the center of the conical bottom portion of the cup is always assured of remaining in the correct operative relationship to said lever under all operating conditions and, therefore, a correct weight indication is always assured, there being no danger of the pointed lower end of the follower pin ever becoming displaced from operative relationship to the lever.

The invention is illustrated in the accompanying drawing, which:

FIG. 1 is a longitudinal section on a reduced scale of a bathroom scale embodying the improvements of my invention;

FIG. 2 is an enlarged section corresponding to the front end portion of FIG. 1 to better illustrate the present improvements, and FIG. 3 is a cross-section on the line 3—3 of FIG. 2.

The same reference numerals are applied to corresponding parts in these three views.

Referring to the drawing, the bathroom scale illustrated is similar to that disclosed in Provi Patents 2,667,387 and 2,668,045, the reference numeral 12 designating the generally rectangular sheet metal base or bottom pan thereof, and 13 the generally rectangular sheet metal platform supported on said base by means of two stamped sheet metal levers 14 and 15, lever 14 being supported on the base 12 on a pair of fulcrums 16 and carrying a pair of hangers 17 on which rest a pair of downwardly projecting legs 18 for support of the rear end portion of the platform 13. In a similar manner, lever 15 is supported on the base 12 on another pair of fulcrums 16' and carries a pair of hangers 17' on which rest another pair of downwardly projecting legs 18', like the legs 18, for support of the front end portion of the platform 13. A coiled tension spring 19 serves as the weighing spring and is suspended above the front end portion of the base 12 for suspension of the front end portion 20 of the lever 14 to resist downward deflection thereof under the weight imposed thereon when a person stands on the platform 13, as when weighing himself. Weight imposed on the platform 13 is transmitted directly to the lever 14 through legs 18 provided under the rear end portion of the platform, but the weight imposed by the front end portion of the platform 13 on lever 15 is transmitted through said lever to the middle portion of lever 14 at the rear end of the lever 15, where there is a hanger 21 pivotally supported at its coaxially aligned ends on the lever 14 and having the notched lower end of a downwardly bent lug 22 on the rear end portion of lever 15 engaged in the downwardly offset crank pin portion provided in the middle of said hanger 21. A tubular screw 25, on the headed lower end 26 of which a cupped washer 27 is swivelled and adjustably connected with the upper end portion of spring 19 in the usual way, as indicated at 28, is suspended on a hand-nut 29 accessible for manual adjustment through an opening 30 provided in a cover plate 31 mounted on top of the platform 13 at the front end thereof, the nut 29 being adjusted one way or the other to adjust the spring 19 up or down in order to set the scale back to zero when and if it gets out of adjustment and requires re-setting. It is the downward deflection of the front end portion 20 of the lever 14 against the resistance of spring 19 that is used to cause rotation of the weight indicating dial 32. This dial is carried on a vertical shaft 33 supported for rotation over the center portion of the base 12, and a pinion 34 is provided on the lower end portion thereof for transmitting rotation thereto. A rack 35 is free to float in a guide 35' (so that it can rise and fall in following the arc of travel of the lower end of lever 38) and meshes with the pinion 34 and is biased toward it by a light coiled tension spring 36 that is attached at one end to the rear end of the rack and at its other end to a lug 37 provided on the rear end portion of lever 14. The spring 36, in addition to holding the rack 35 resiliently in engagement with pinion 34, exerts enough pull rearwardly on the rack to operate the dial 32 whenever the rack is free to move, as when the lever 14 is given downward deflection in a weighing operation, a bell-crank lever 38 pivotally connected at 39 to the front end of rack 35 being then allowed to oscillate from its zero position through an angle, the size of which is proportionate to the amount of extension of spring 19 and downward deflection of lever 14, so as to cause rotation of dial 32 through a proportionate angularity and accordingly indicate accurately the weight of the person standing on the scale. Bell-crank lever 38 is pivoted with respect to the base 12 on a horizontal axis, as indicated at 40, a horizontally extending pin providing this pivot, the pin extending through laterally spaced registering holes provided in laterally spaced portions of said lever and being supported in a bracket 41 that is mounted on top of the front end portion 42 of an elongated sheet metal channel-shaped member 43 that serves also to support the dial and pinion on its rear end and is mounted by means of its web portion 44 on the front middle portion of the base 12, in accordance with Provi et al., Patent Number 2,875,999.

A circular hole 49 in the transverse horizontal web portion 50 of bracket 41 receives the tapered portion 51 of the hand-nut 29 for support of the spring 19 and suspension of the front end portion 20 of lever 14. As described in the copending Provi application mentioned above, it is due to the fact that the downward deflection of the front end portion 20 of lever 14 against the resistance of spring 19 is reflected so accurately by endwise movement of a follower pin 52 extending through the tubular screw 25 and hence disposed accurately on the center line of the spring 19 that such close accuracy in weight readings on dial 32 is obtained. The lower end of the pin 52 has to move accurately with the loop 53 on the lower end of the spring 19 that is received in the slot 54 in the front end portion 20 of the lever 14 by fulcruming of the pin on the front end portion 20 of lever 14, but inasmuch as this front end portion 20 of the sheet metal lever is usually bent so as to be disposed edgewise in the vertical plane of the pin 52, as best appears in FIG. 3, this has presented a problem, because, obviously, such slight misalignment as could occur in the quantity production of the scales or might arise in shipment because of rough handling of a scale, causing a certain amount of lateral displacement of the one part with respect to the other, could result in the conically pointed lower end of the pin 52 no longer remaining fulcrumed on top of the front end portion 20, by reason of the point riding off one side or the other of said end portion, and, of course, it is important that the lower end of the pin 52 be conically pointed, as at 57, for a low friction fulcrum and accordingly greater accuracy in the indicated weight reading. The upper end 58 of the pin is also conically pointed for this same reason, that end being fulcrumed in a conical recess 59 in the forwardly extending arm 60 of the bell-crank lever 38. The pin 52 has a loose fit in the tubular screw 25 as indicated by the clearance 61 in FIGS. 2 and 3, so that there is no danger of friction interfering with the freedom of endwise movement of the pin and being reflected by errors in the indicated weight.

In accordance with my invention, a stamped sheet metal cup 62, having a conically formed bottom 63, is fulcrumed at its apex 64 on top of the front end portion 20 of the lever 14 and, being guided against displacement laterally from operative relationship to the lever 14 by abutment on either side with the coils of the spring 19, is always assured of remaining in proper fulcrum engagement with the top of the front end portion 20 of lever 14, and, inasmuch as the conically pointed lower end 57 of the follower pin 52 is fulcrumed in the apex portion 64 of the conically shaped bottom 63 of the cup, the pin 52 is therefore always assured of being properly fulcrumed on the front end portion 20 of the lever 14.

In operation, the washer 27 will be adjusted with respect to spring 19 in a separate operation before this assembly is assembled in the scale. Then, in the calibration of the scale, the washer 27 will be adjusted slightly up or down on the spring 19 as required. Thereafter, the user need adjust only the hand-nut 29 occasionally whenever the scale does not happen to return to zero after use. No other adjustments are necessary. In the event a person jumps on the platform 13, no harm can be done, inasmuch as the bell-crank lever 38 is always operated gently in response only to the light tension of spring 36, regardless of how suddenly and roughly the lever 14 may be deflected downwardly. Whenever the follower pin 52 is subjected to jostling, as in shipment of the scale or when a person jumps on the platform 13, there is no danger with the present construction of the pin 52 becoming displaced from its proper operative relationship between the end 60 of the lever 38 and the front end portion 20 of the lever 14, because the cup 62 in such event is guided by the spring 19 to remain in proper relationship to the lever 14, and the conical bottom portion 63 of the cup 62 serves to guide the pin 52 back to its central position in the apex portion 64, and, inasmuch as the conical depression 59 in arm 60 receives the upper end 58 of the pin, that end will also return to the apex portion of that depression.

It is believed the foregoing description conveys a good understanding of the objects and advantages of my invention. The appended claims have been drawn to cover all legitimate modifications and adaptations.

I claim:

1. A weighing scale comprising a base, weighing levers fulcrumed thereon, a platform movably supported above said base on said levers, a coiled tension spring serving as the weighing spring suspended on said base and connected with said weighing levers to resist downward deflection thereof under weight applied to the platform, weight indicating means, means for operating said weight indicating means movable in response to downward deflection of said weighing levers, said operating means including a vertical follower pin extending through said spring and disposed on the center line thereof and arranged to move endwise the same distance as the spring is extended in each weighing operation to operate the weight indicating means accordingly and give an accurate weight reading, and cylindrical guide means for said pin in concentric relationship thereto and maintained in concentric relationship to the spring by a loose telescoping relationship thereto and movable vertically with the pin in the spring's extension in weighing so as to keep the pin on the center line of the spring for more uniformly accurate weighing.

2. A weighing scale as set forth in claim 1 wherein said cylindrical guide means comprises a cup having side walls which are cylindrical and are in telescoping relationship to the spring, and a transverse wall in the center of which the pin is kept centered relative to the cup and hence centered relative to the spring.

3. A weighing scale as set forth in claim 1 wherein said cylindrical guide means comprises a cup having side walls which are cylindrical and are in telescoping relationship to the spring, and a conical bottom wall resting at its apex on one of the weighing levers and having the lower end of the pin centered relative to said cup by engagement in the center of the apex portion thereof.

4. A weighing scale as set forth in claim 1 wherein said cylindrical guide means comprises a cup having side walls which are cylindrical and are in telescoping relationship to the spring, and a conical bottom wall resting at its apex on one of the weighing levers and having the lower end of the pin centered relative to said cup by engagement in the center of the apex portion thereof, the lower end of said pin being of conical form and having point contact in the center of said apex portion.

5. A weighing scale comprising a base, weighing levers fulcrumed thereon, a platform movably supported above said base on said levers, a coiled tension spring serving as the weighing spring suspended on said base and connected with said weighing levers to resist downward deflection thereof under weight applied to the platform, weight indicating means, a bell-crank lever pivoted with respect to said base having one arm thereof pivotally connected with said weight indicating means to operate it and having the other arm thereof extending over said spring, a follower pin extending through said spring and disposed on the center line thereof operatively connecting said last mentioned arm with the extensible end of said coiled spring and movable endwise the same distance as said spring is extended in each weighing operation, whereby to operate the weight indicating means so as to give an accurate weight indication, and cylindrical guide means for said pin in concentric relationship thereto and maintained in concentric relationship to the spring by a loose telescoping fit therein and movable vertically with the pin in the spring's extension in weighing so as to keep the pin on the center line of the spring for more uniformly accurate weighing.

6. A weighing scale as set forth in claim 5 wherein said cylindrical guide means comprises a cup having side walls which are cylindrical and are in telescoping relationship to the spring, and a transverse wall in the center of which the pin is kept centered relative to the cup and hence centered relative to the spring.

7. A weighing scale as set forth in claim 5 wherein said cylindrical guide means comprises a cup having side walls which are cylindrical and are in telescoping relationship to the spring, and a conical bottom wall resting at its apex on one of the weighing levers and having the lower end of the pin centered relative to said cup by engagement in the center of the apex portion thereof.

8. A weighing scale as set forth in claim 5 wherein said cylindrical guide means comprises a cup having side walls which are cylindrical and are in telescoping relationship to the spring, and a conical bottom wall resting at its apex on one of the weighing levers and having the lower end of the pin centered relative to said cup by engagement in the center of the apex portion thereof, the lower end of said pin being of conical form and having point contact in the center of said apex portion.

9. A weighing scale as set forth in claim 5, wherein the extensible end of said coiled spring supports one end of one of said weighing levers, said weighing lever having the lower end of the follower pin fulcrumed thereon to move along the arc described by the end of said lever in the deflection thereof under load applied thereto by the platform, and the upper end of said follower pin being likewise fulcrumed with respect to the over-hanging arm of said bell-crank lever to follow the arc described by said arm, said cylindrical guide means comprising a cup having side walls which are cylindrical and slidable loosely inside the spring, and a conical bottom wall fulcrumed at its apex on the weighing lever and having the lower end of the follower pin centered relative to said cup by engagement in the center of the apex portion thereof and thereby fulcrumed on said weighing lever.

10. A weighing scale as set forth in claim 9 wherein the lower end of said follower pin is of conical form and has point contact in the center of the apex portion of the conical bottom of said cup.

11. A weighing scale as set forth in claim 9 wherein the overhanging arm of said bell-crank lever has a V-formation in the center of which the upper end of said follower pin is fulcrumed.

12. A weighing scale as set forth in claim 9 wherein the overhanging arm of said bell-crank lever has a conical depression open to the underside thereof, and the upper end of said pin is conically pointed and received in the apex of said depression.

No references cited.